United States Patent [19]

DeBusk et al.

[11] Patent Number: 6,085,493

[45] Date of Patent: Jul. 11, 2000

[54] METHOD FOR THE SUPPLY OF MEDICAL SUPPLIES TO A HEALTH-CARE INSTITUTION BASED ON A NESTED BILL OF MATERIALS ON A PROCEDURE LEVEL

[75] Inventors: A. O. V. DeBusk, Knoxville; Brian C. DeBusk, Clinton; Steven Eugene Bennett; Steven J. Polte, both of Knoxville, all of Tenn.

[73] Assignee: DeRoyal Industries, Inc., Powell, Tenn.

[21] Appl. No.: 08/889,948

[22] Filed: Jul. 10, 1997

Related U.S. Application Data

[63] Continuation-in-part of application No. 08/489,496, Jun. 12, 1995, Pat. No. 5,682,728.

[51] Int. Cl.⁷ .............................. B65B 5/00; B65B 11/50; B65B 61/20
[52] U.S. Cl. ............................ 53/445; 53/467; 53/449; 53/474
[58] Field of Search .............................. 53/445, 467, 449, 53/474, 443, 468, 475, 155, 238, 240

[56] References Cited

U.S. PATENT DOCUMENTS

| | | |
|---|---|---|
| 4,174,598 | 11/1979 | Shepherd et al. . |
| 5,235,795 | 8/1993 | DeBusk . |
| 5,406,770 | 4/1995 | Fikacek ................................. 53/155 X |
| 5,469,692 | 11/1995 | Xanthopoulos ........................... 53/474 |

FOREIGN PATENT DOCUMENTS 0 556 093 A1   4/1993   European Pat. Off. .

*Primary Examiner*—Linda Johnson
*Attorney, Agent, or Firm*—Paul E. Hodges

[57] ABSTRACT

A method for integration of the institutional supply chain for medical products utilizing a nested bill of materials on a care event level of a clinical pathway for one or more medical procedures. The medical supplies appropriate for use in a care event are expressed as a bill of materials. Each item of medical supply is assigned a unique identifier which includes at least identification of the item itself, identification of the supplier of the item, and identification of the care event with which the item is to be used. Portions of the supplies are provided by multiple vendors to a unitized container sequencing center where the supplies are bundled by care events and packed into a unitized container. This container is then shipped to a customer or distributor for further shipment to a customer.

7 Claims, 22 Drawing Sheets

BILL OF MATERIAL REPORT
FOR CURRENT REVISIONS

ASSEMBLY PART NUMBER: 90-0002  COMPONENT EFFECTIVE DATE: 06/16/97
DESCRIPTION: BASIC CARDIAC TRACEPAK  PMC: 0  SC: M  REV: 12  S/UM: CS  P/UM: CS
COMPONENT SORT BY: ECO NUMBER: QMS12655

| COMPONENT PART NUMBER | DESCRIPTION | SC | RV | S/ UM | P/ UM | ITEM NUMBER | QUANTITY PER ASSY |
|---|---|---|---|---|---|---|---|
| 0123456789012345678 9--- | | | | | | | |
| 56-11099 | BOX, TRACECART 20.5X19X34.3 | P | 0 | EA | EA | 0 | 1.000000 |
| 56-11359R | BASE, RETRACE TRACECRT, 40 G | P | 0 | EA | EA | 0 | 1.000000 |
| 56-52346 | LID, RETRACE, TRACECART | P | 0 | EA | CS | 0 | 1.000000 |
| 91-OPER00010002 | OPER CARE EVENT | X | 12 | EA | EA | 1 | 1.000000 |
| 92-DER0002OPER | DER SUPPLY BNDL FOR OPER | X | 12 | EA | EA | 1 | 1.000000 |
| 32-1015 | TWL, OR XLONG BLUE 6/PK | P | 0 | PK | CS | 1 | 1.000000 |
| 50-10534 | TRAY, BASIC CARDIAC | MS | 4 | EA | EA | 1 | 1.000000 |
| 50-10534P | BASIC CARDIAC TRAY | X | 4 | EA | EA | 0 | 1.000000 |
| 5-0108 | NDL CTR, DOUBLE MAGNET 60CT | P | 0 | EA | CS | 6 | 1.000000 |
| 5-10605 | TRAY, 4-COMP 8.75X10.5X1.93 | P | 0 | EA | EA | 1 | 1.000000 |
| 5-10882 | TRAY PROTECTOR, FOAM, 20X17 | P | 0 | EA | CS | 11 | 2.000000 |
| 5-1175 | GZE, 4X4 16 PLY XR BANDED 1 | PU | 0 | EA | CS | 6 | 20.000000 |

FIG. 6A

| COMPONENT PART NUMBER 0123456789012345678 9--- | DESCRIPTION | SC | RV | S/ UM | P/ UM | ITEM NUMBER | QUANTITY PER ASSY |
|---|---|---|---|---|---|---|---|
| 5-12200 | MKR, SKIN STD TIP W/RULER | P | 0 | EA | CS | 7 | 2.000000 |
| 5-12823 | SUTURE BOOTS, MINI YELLOW 1 | P | 0 | PK | CS | 2 | 1.000000 |
| 5-1583 | BAG, STERILIZATION 27X34" 4 | P | 0 | EA | CS | 12 | 1.000000 |
| 5-17748 | CVR, BK TBL 54 X 85 | P | 0 | EA | CS | 11 | 1.000000 |
| 5-17844 | SET, EXT, 30" LL ADAP, 4.0ML, | P | 0 | EA | CS | 3 | 1.000000 |
| 5-17845 | KITTNR, 1/4X9/16", XR 5/PK | P | 0 | PK | CS | 2 | 1.000000 |
| 5-1853 | TRAY, PREP 2 COM 9.56X4.63X | P | 0 | EA | EA | 1 | 1.000000 |
| 5-1871 | BOWL, 32 OZ SPONGE BLUE 10 | P | 0 | EA | EA | 1 | 1.000000 |
| 5-1873 | BOWL, 16 OZ 500CC | P | 0 | EA | EA | 1 | 1.000000 |
| 5-1918A | LAP, 18X18 WSHD,LOOP,XR 5S | P | 0 | EA | CS | 8 | 20.000000 |
| 5-2856 | SYR, 1CC, SLIP (ST/309602) | P | 0 | EA | CS | 4 | 1.000000 |
| 5-2934 | SYR, 60CC, SLIP (ST 301627) | P | 0 | EA | CS | 7 | 3.000000 |
| 5-2991 | NDL, 30GX1/2" REG, SPEC USE, | P | 0 | EA | CS | 4 | 1.000000 |
| 5-3001 | NDL, 18GX1-1/2" RB (ST 3051 | P | 0 | EA | CS | 4 | 1.000000 |
| 5-3016 | NDL, 25GX5/8" RB (ST 305122 | P | 0 | EA | CS | 4 | 2.000000 |
| 5-3024 | SUT NDL, 3/8, REV, 9, REG SUR | P | 0 | PK | BX | 2 | 1.000000 |
| 5-3033 | SYR, 5CC, LL (ST/309603) | P | 0 | EA | CS | 4 | 2.000000 |

FIG. 6B

| COMPONENT PART NUMBER 0123456789012345678 9--- | DESCRIPTION | SC | RV | S/ UM | P/ UM | ITEM NUMBER | QUANTITY PER ASSY |
|---|---|---|---|---|---|---|---|
| 5-3035 | SYR, 10CC,LL (ST/309604) | P | 0 | EA | CS | 7 | 2.000000 |
| 5-3041 | SYR, 60CC,LL (ST 309663) | P | 0 | EA | CS | 7 | 2.000000 |
| 5-3050 | SYR, BULB IRRIG 50CC | P | 0 | EA | CS | 6 | 2.000000 |
| 5-3107 | BAG, SUT 6.5X11.3 WT NON-LA | P | 0 | EA | CS | 1 | 1.000000 |
| 5-3200 | BLD, 10, CRBN, R-B, ST | P | 0 | EA | CS | 3 | 2.000000 |
| 5-3205 | BLD, 11, CRBN, R-B, ST | P | 0 | EA | CS | 3 | 3.000000 |
| 5-3210 | BLD, 15, CRBN, R-B, ST | P | 0 | EA | CS | 3 | 3.000000 |
| 5-3258 | CONN, Y 3/8X3/8X3/8 NONPARA | P | 0 | EA | CS | 5 | 1.000000 |
| 5-3262 | CONN,STRAIGHT 1/2X1/2 PERF | P | 0 | EA | CS | 5 | 1.000000 |
| 5-3288 | CONN,STRAIGHT 3/8 PERFUSIO | P | 0 | EA | CS | 5 | 1.000000 |
| 5-3323 | TIP CLNR FOR CAUTERY PNCL | P | 0 | EA | CS | 3 | 1.000000 |
| 5-3422 | STERI-STRIP, 1/2X4", 3STR/CA | P | 0 | EA | EA | 2 | 6.000000 |
| 5-4042 | DRP, FLAT 41 X 57, HALF, SNTA | P | 0 | EA | CS | 9 | 1.000000 |
| 5-5004 | TWL, OR WHITE HI-SORB I | P | 0 | EA | CS | 8 | 8.000000 |
| 5-5042 | TWL, OR BLUE COTTON /NS | P | 0 | EA | CS | 9 | 18.000000 |
| 5-6120 | SPG, FLAT STICK 2", XR, GZ | P | 0 | EA | CS | 1 | 10.000000 |
| 5-6445 | TAPE STRIP, 2X5" W/DEROYAL | P | 0 | EA | EA | 11 | 1.000000 |
| 5-9214 | GRADUATE, 1000CC MEASURE W/ | P | 0 | EA | CS | 7 | 2.000000 |

FIG. 6C

| COMPONENT PART NUMBER 0123456789012345678 9--- | DESCRIPTION | SC | RV | S/ UM | P/ UM | ITEM NUMBER | QUANTITY PER ASSY |
|---|---|---|---|---|---|---|---|
| SA50-10534P-1 | TRAY W/ SLEEVE PROTECTOR | X | 4 | EA | EA | 1 | 1.000000 |
| 5-13187 | TRAY PROTECTOR, SMALL 15X25 | P | 0 | EA | CS | 1 | 1.000000 |
| 5-1895 | TRAY, MAYO 200 19X12.5 | P | 0 | EA | EA | 1 | 2.000000 |
| SA50-10534P-2 | BLUE LABELS, CUT | X | 4 | EA | EA | 4 | 1.000000 |
| 5-10385 | LBL:BLANK 1X3":BLUE, CUT .5X | P | 0 | EA | CS | 1 | 12.000000 |
| SA50-10534P-3 | STANDARD FOLD, BTC. | X | 4 | EA | EA | 10 | 1.000000 |
| TRLAB-001 | LBL:DEROYAL 1-UP TRAY STE | P | 0 | PK | CS | 12 | 1.000000 |
| 55-3275 | PLDGT, TFLN 1/4X1/8X1/16 6 | P | 0 | PK | BX | 1 | 1.000000 |
| 55-8040 | PLDGT, TFLN 3/8X3/16X1/16 | P | 0 | PK | BX | 1 | 3.000000 |
| 63-100 | TWL, OR BLUE 8PK SNGL WRP S | P | 0 | EA | CS | 1 | 2.000000 |
| 83-000069 | YANKAUER, BULB TIP W/O VEN | P | 0 | EA | CS | 1 | 1.000000 |
| 92-DLR0002OPER | DLR SUPPLY BNDL FOR OPER | PX | 12 | EA | EA | 2 | 1.000000 |
| 92-HOS0002OPER | HOS SUPPLY BNDL FOR OPER | X | 12 | EA | EA | 3 | 1.000000 |
| 91-PROP00010002 | PRE-OP CARE EVENT | X | 12 | EA | EA | 0 | 1.000000 |
| 92-DLR0002PROP | DLR SUPPLY BNDL FOR PROP | PX | 12 | EA | EA | 4 | 1.000000 |
| TPAK-LAB | LBL:8"BLNK WTE RL "TRCPK CO | P | 0 | EA | RL | 0 | 1.000000 |

FIG. 6D

BILL OF MATERIAL REPORT
FOR CURRENT REVISIONS

ASSEMBLY PART NUMBER: 92-DLR0002OPER         COMPONENT EFFECTIVE DATE: 06/16/97
DESCRIPTION: DLR SUPPLY BND FOR OPER  PMC: 0   SC: PX   REV: 12   S/UM: EA   P/UM: EA
COMPONENT SORT BY:   ECO NUMBER: QMS12655

| COMPONENT PART NUMBER | DESCRIPTION | SC | RV | S/ UM | P/ UM | ITEM NUMBER | QUANTITY PER ASSY |
|---|---|---|---|---|---|---|---|
| 0007025100 | MYP WIRE 24/BX | P | 0 | EA | EA | 2 | 4.000000 |
| 04160G6050 | CLIPS SURG SPRING SOFT/FIB | P | 0 | EA | EA | 2 | 4.000000 |
| 04160G6150 | FOGARTY INSERT, SOFT/FIBRA | P | 0 | EA | EA | 2 | 1.000000 |
| 04160G3650 | FOGARTY INSERT, | P | 0 | EA | EA | 2 | 1.000000 |
| 0421591081 | CANNULAE PERFUSION ANGL TH | P | 0 | EA | EA | 2 | 1.000000 |
| 042240203001 | TUBING, PRESSURE MONITORIN | P | 0 | EA | EA | 2 | 1.000000 |
| 0620390216 | TR FOLEY UROTRACK PLUS | P | 0 | EA | EA | 2 | 1.000000 |
| 1444427563 | ADAPTER INTRAMEDIC TUBING | P | 0 | EA | EA | 2 | 2.000000 |
| 1352A6050ATS | SUCTION, ADULT-PEDIATRIC | P | 0 | EA | EA | 2 | 1.000000 |
| 1997020114 | CANNULA GROUP AORTA | P | 0 | EA | EA | 2 | 1.000000 |
| 1997030001 | CANNULA VSL W/DUCKBILL | P | 0 | EA | EA | 2 | 2.000000 |

FIG. 6E

| COMPONENT PART NUMBER<br>0123456789012345678 --- | DESCRIPTION | SC | RV | S/<br>UM | P/<br>UM | ITEM<br>NUMBER | QUANTITY<br>PER ASSY |
|---|---|---|---|---|---|---|---|
| 199794115T | RETROG CORONARY SINUS CANN | P | 0 | EA | EA | 2 | 1.000000 |
| 22990LS100 | CLIP LIGATING X LIGACLIP S | P | 0 | PK | EA | 2 | 4.000000 |
| 22990MSM20 | APPLIER MCA MULTI-CLIP 20 | P | 0 | EA | EA | 2 | 2.000000 |
| 22990PPW55 | SKIN STAPLERS WIDE | P | 0 | EA | EA | 2 | 2.000000 |
| 2300001943 | SPNG ABS HEMOSTAT SURGICEL | P | 0 | EA | EA | 2 | 1.000000 |
| 230003816E | E PACK KIT | .P | 0 | KT | EA | 2 | 1.000000 |
| 23000M649G | SUTURES STEEL 6 | P | 0 | EA | EA | 2 | 2.000000 |
| 3460000260 | CVR TABLE BACK BARRIER | P | 0 | EA | EA | 2 | 2.000000 |
| 3642089466 | C V INCISE SHEET | P | 0 | EA | EA | 2 | 1.000000 |
| 3642089621 | CVR TABLE OVERHEAD | P | 0 | EA | EA | 2 | 1.000000 |
| 3642090112 | GOWN SURG STRL W/TWL LG | P | 0 | EA | EA | 2 | 4.000000 |
| 4340002002 | MEDI-PLAST BAG DECANTER | P | 0 | EA | EA | 2 | 1.000000 |
| 5114CDS003P | CARDIO-PLEJICET | P | 0 | EA | EA | 2 | 1.000000 |
| 5612012340 | SARNS TWO STAGE VENOUS | P | 0 | EA | EA | 2 | 1.000000 |
| 66030E7507 | GROUNDING PAD POLYHESIVE I | P | 0 | EA | EA | 2 | 2.000000 |
| 6603E2515H | PENCILE CAUTERY | P | 0 | EA | EA | 2 | 2.000000 |

FIG. 6F

BILL OF MATERIAL REPORT
FOR CURRENT REVISIONS

ASSEMBLY PART NUMBER: 92-DLR0002PROP        COMPONENT EFFECTIVE DATE: 06/16/97
DESCRIPTION: DLR SUPPLY BND FOR OPER PMC:  0  SC: PX  REV: 12  S/UM: EA  P/UM: EA
COMPONENT SORT BY:  ECO NUMBER: QMS12655

| COMPONENT PART NUMBER<br>0123456789012345678 9--- | DESCRIPTION | SC | RV | S/<br>UM | P/<br>UM | ITEM<br>NUMBER | QUANTITY<br>PER ASSY |
|---|---|---|---|---|---|---|---|
| 0189100028AT | THORACIC CATH 28 | P | 0 | EA | EA | 4 | 1.000000 |
| 06200036550 | TB CONN SUCT N/C | P | 0 | EA | EA | 4 | 2.000000 |
| 07072D7253 | GLOVES SURGEONS SZ 7, STER | P | 0 | PR | EA | 4 | 4.000000 |
| 1475378421 | SURG PREP PK W/IODOPHOR W/ | P | 0 | EA | EA | 4 | 1.000000 |
| 3583006939 | SPNG GAUZE STRL 10'S 12PLY | P | 0 | TR | PK | 4 | 2.000000 |
| 450901626W | DRSG TRNSP TEGADERM 4 X 4 | P | 0 | EA | EA | 4 | 5.000000 |
| 4509022593 | ELECTRODE MNTRG RED DOT AD | P | 0 | BG | EA | 4 | 2.000000 |
| 5210PD5454 | SET UP COVER 54 X 54 | P | 0 | EA | EA | 4 | 1.000000 |
| 626850695901 | PRE-VENT ULNAR NERVE PROTE | P | 2 | PR | EA | 4 | 1.000000 |

FIG. 6G

BILL OF MATERIAL REPORT
FOR CURRENT REVISIONS

ASSEMBLY PART NUMBER: 92-HOS0002OPER    COMPONENT EFFECTIVE DATE: 06/16/97

DESCRIPTION: HOS SUPPLY BNDL FOR OPER    PMC: 0    SC: M    REV: 12    S/UM: EA    P/UM: EA
COMPONENT SORT BY: ECO NUMBER: QMS12655

| COMPONENT PART NUMBER | DESCRIPTION | SC | RV | S/ UM | P/ UM | ITEM NUMBER | QUANTITY PER ASSY |
|---|---|---|---|---|---|---|---|
| 0123456789012345678 9--- | | --- | --- | --- | --- | --- | --- |
| 5059-32 | STERNAL SAW BLADE | P | 2 | EA | EA | 3 | 1.000000 |
| AP240 | AORTIC PUNCH 4.0 | P | 2 | EA | EA | 3 | 1.000000 |
| CPS02 | CARDIOPLEGIA FILTER | P | 2 | EA | EA | 3 | 1.000000 |
| LC15-4005-001 | INSULATION PAD | P | 2 | EA | EA | 3 | 1.000000 |
| SU130-1305 | JP DRAIN & RESERVOIR | P | 2 | EA | EA | 3 | 1.000000 |

FIG. 6H

Page: 1
Sort: Item

TracePak Management System
Parts Needed Report

Date: 06/16/97
Time: 10:13:44

Purchase Order #: 0
DeRoyal Lot #: 0
Customer Account #:
Customer Name : METHODIST MEDICAL CENTER OF OAK RIDGE Date Ordered: 06/16/97
Branch #: 78
TracePak Account #:

| Item | Description | | Qty |
|---|---|---|---|
| 90-0002.12 | BASIC CARDIAC TRACEPAK | | 1 |

| Part (Iref #) | Description | Unit | Qty |
|---|---|---|---|
| 0007025100 | MYP WIRE 24/BX | EA | 4 |
| 0189100028AT | THORACIC CATH 28 | EA | 1 |
| 04160G6050 | CLIPS SURG SPRING SOFT/FIBRA 6 | EA | 4 |
| 04160G6150 | FOGARTY INSERT, SOFT/FIBRA | EA | 1 |
| 04160G8650 | FOGARTY INSERT, | EA | 1 |
| 0421591081 | CANNULAE PERFUSION ANGL THI | EA | 1 |
| 04224020800I | TUBING, PRESSURE MONITORING | EA | 1 |
| 0620003655O | TB CONN SUCT N/C   1/4 | EA | 2 |
| 0620890216 | TR FOLEY UROTRACK PLUS | EA | 1 |
| 07072D7253 | GLOVES SURGEONS SZ 7, STERILE | PR | 4 |

FIG. 7A

| Part (Iref #) | Description | Unit | Qty |
|---|---|---|---|
| 1444427563 | ADAPTER INTRAMEDIC TUBING | EA | 2 |
| 1475378421 | SURG PREP PK W/IODOPHOR W/O PA | EA | 1 |
| 1852A6050ATS | SUCTION, ADULT-PEDIATRIC | EA | 1 |
| 1997020114 | CANNULA GROUP AORTA | EA | 1 |
| 1997030001 | CANNULA VSL W/DUCKBILL | EA | 2 |
| 199794115T | RETROG CORONARY SINUS CANN | EA | 1 |
| 22990LS100 | CLIP LIGATING X LIGACLIP SS SM | PK | 4 |
| 22990MSM20 | APPLIER MCA MULTI-CLIP 20 MED | EA | 2 |
| 22990PPW55 | SKIN STAPLERS WIDE | EA | 2 |
| 2300001943 | SPNG ABS HEMOSTAT SURGICEL | EA | 1 |
| 230003 6816E | E PACK KIT | KT | 1 |
| 23000M649G | SUTURES STEEL 6 | EA | 2 |
| 3460000260 | CVR TABLE BACK BARRIER 44' X | EA | 2 |
| 3583006939 | SPNG GAUZE STRL 10'S 12PLY | TR | 2 |
| 3642089466 | C V INCISE SHEET | EA | 1 |
| 3642089621 | CVR TABLE OVERHEAD 76 | EA | 1 |
| 3642090112 | GOWN SURG STRL W/TWL LG | EA | 4 |
| 4340002002 | MEDI-PLAST BAG DECANTER | EA | 1 |
| 450901626W | DRSG TRNSP TEGADERM 4 X 4 3/4 | EA | 5 |

FIG. 7B

| Part (Iref #) | Description | Unit | Qty |
|---|---|---|---|
| 4509022593 | ELECTRODE MNTRG RED DOT AD | BG | 2 |
| 5210PD5454 | SET UP COVER 54 X 54 | EA | 1 |
| 5414CDS003P | CARDIO-PLEJICET | EA | 1 |
| 5612012340 | SARNS TWO STAGE VENOUS | EA | 1 |
| 626850695901 | PRE-VENT ULNAR NERVE PROTECTOR | PR | 1 |
| 66080E7507 | GROUNDING PAD POLYHESIVE II | EA | 2 |
| 6608E2515H | PENCILE CAUTERY | EA | 2 |

FIG. 7C

Page: 1  
Sort: Item

Purchase Order #: 0
DeRoyal Lot #: 0
Customer Account #:
Customer Name: METHODIST MEDICAL CENTER OF OAK RIDGE TracePak Management System
Parts Needed Report Date: 06/16/97
Time: 10:13:44

Date Ordered: 06/16/97
Branch #: 78
TracePak Account #:

| Item | Description | | | Qty |
|---|---|---|---|---|
| 90-0002.12 | BASIC CARDIAC TRACEPAK | | | 1 |

| Supply Bundle | Description | | Unit | Qty |
|---|---|---|---|---|
| 92-DLR0002PROP | DLR SUPPLY BNDL FOR PROP | | | 1 |
| 0189100028AT | THORACIC CATH 28 | | EA | 1 |
| 06200036550 | TB CONN SUCT N/C | 1/4 | EA | 2 |
| 07072D7253 | GLOVES SURGEONS SZ 7, STERILE | | PR | 4 |
| 1475378421 | SURG PREP PK W/IODOPHOR W/O PA | | EA | 1 |
| 3583006939 | SPNG GAUZE STRL 10'S 12PLY | | TR | 2 |
| 45090l626W | DRSG TRNSP TEGADERM 4 X 4 3/4 | | EA | 5 |
| 4509022593 | ELECTRODE MNTRG RED DOT AD | | BG | 2 |
| 5210PD5454 | SET UP COVER 54 X 54 | | EA | 1 |
| 62685069590l | PRE-VENT ULNAR NERVE PROTECTOR | | PR | 1 |

FIG. 7D

| Supply Bundle | Description | | Unit | Qty |
|---|---|---|---|---|
| 92-DLR0002PROP | DLR SUPPLY BNDL FOR OPER | | PR | 1 |
| | 0007025100 | MYP WIRE 24/BX | EA | 4 |
| | 04160G6050 | CLIPS SURG SPRING SOFT/FIBRA 6 | EA | 4 |
| | 04160G6150 | FOGARTY INSERT, SOFT/FIBRA | EA | 1 |
| | 04160G8650 | FOGARTY INSERT, | EA | 1 |
| | 0421591081 | CANNULAE PERFUSION ANGL THI | EA | 1 |
| | 042240208001 | TUBING, PRESSURE MONITORING | EA | 1 |
| | 062089O216 | TR FOLEY UROTRACK PLUS | EA | 1 |
| | 1444427563 | ADAPTER INTRAMEDIC TUBING | EA | 2 |
| | 1852A6050ATS | SUCTION, ADULT-PEDIATRIC | EA | 1 |
| | 1997020114 | CANNULA GROUP AORTA | EA | 1 |
| | 1997030001 | CANNULA VSL W/DUCKBILL | EA | 2 |
| | 19979411ST | RETROG CORONARY SINUS CANN | EA | 1 |
| | 22990LS100 | CLIP LIGATING X LIGACLIP SS SM | PK | 4 |
| | 22990MSM20 | APPLIER MCA MULTI-CLIP 20 MED | EA | 2 |
| | 22990PPW55 | SKIN STAPLERS WIDE | EA | 2 |
| | 2300001943 | SPNG ABS HEMOSTAT SURGICEL | EA | 1 |
| | 230003816E | E PACK KIT | KT | 1 |

FIG. 7E

| Supply Bundle | Description | Unit | Qty |
|---|---|---|---|
| 23000M649G | SUTURES STEEL 6 | EA | 2 |
| 3460000260 | CVR TABLE BACK CARRIER 44"X | EA | 2 |
| 3642089466 | C V INCISE SHEET | EA | 1 |
| 3642089621 | CVR TABLE OVERHEAD 76 | EA | 1 |
| 3642090112 | GOWN SURG STRL W/TWL LG | EA | 4 |
| 4340002002 | MEDI-PLAST BAG DECANTER | EA | 1 |
| 5414CDS003P | CARDIO-PLEJICET | EA | 1 |
| 5612012340 | SARNS TWO STAGE VENOUS | EA | 2 |
| 66080E7507 | GROUNDING PAD POLYHESIVE II | EA | 2 |
| 6608E2515H | PENCILE CAUTERY | EA | 2 |

FIG. 7F

Bundle Identification Label

Supply Bundle   : 92-DER0002OPER
Sequence #      : 1
TracePak Part # : 90-0002.12
DeRoyal Lot #   : 0
Order Date      : 06/16/97
PO#             : 0
Item Count      : 9.00

FIG. 7G

Page: 1
Sort: Item

TracePak Management System
Parts Needed Report

Date: 06/16/97
Time: 10:13:44

Purchase Order #: 0
DeRoyal Lot #: 0
Customer Account #:
Customer Name : METHODIST MEDICAL CENTER OF OAK RIDGE Date Ordered: 06/16/97
Branch #: 78
TracePak Account #:

| Item | Description | Qty |
|---|---|---|
| 90-0002.12 | BASIC CARDIAC TRACEPAK | 1 |

| Supply Bundle | Description | Sequence | Qty |
|---|---|---|---|
| 92-DLR0002PROP | DLR SUPPLY BNDL FOR PROP | 4 | 1 |
| 92-DLR0002OPER | DLR SUPPLY BNDL FOR OPER | 2 | 1 |
| 92-DER0002OPER | DER SUPPLY BNDL FOR OPER | 1 | 1 |

Special Instructions:
Stamp expiration date on distributor's part of label.

FIG. 7H

Page: 1
Sort: Item

TracePak Management System
Parts Needed Report

Date: 06/16/97
Time: 10:13:44

Purchase Order #: 0
DeRoyal Lot #: 0
Customer Account #:
Customer Name : METHODIST MEDICAL CENTER OF OAK RIDGE Date Ordered: 06/16/97
Branch #: 78
TracePak Account #:

| Item | Description | Qty |
|---|---|---|
| 90-0002.12 | BASIC CARDIAC TRACEPAK | 1 |

| Supply Bundle | Description | Seq | Assembled by | Qty |
|---|---|---|---|---|
| 92-DLR0002PROP | DLR SUPPLY BNDL FOR PROP | 4 | _____ | 1 |
| 92-DLR0002OPER | DLR SUPPLY BNDL FOR OPER | 2 | _____ | 1 |
| 92-DER-0002OPER | DER SUPPLY BNDL FOR OPER | 1 | _____ | 1 |

FIG. 7I

METHOD FOR THE SUPPLY OF MEDICAL SUPPLIES TO A HEALTH-CARE INSTITUTION BASED ON A NESTED BILL OF MATERIALS ON A PROCEDURE LEVEL

RELATED APPLICATIONS

This application is a continuation in part of U.S. Pat. application Ser. No. 08/489,496, filed on Jun. 12, 1995, entitled METHOD FOR THE SUPPLY OF MEDICAL SUPPLIES TO A HEALTH-CARE INSTITUTION BASED ON A NESTED BILL OF MATERIALS ON A PROCEDURE LEVEL now U.S. Pat. No. 5,682,728.

FIELD OF THE INVENTION

This invention relates to the supply of medical supplies to patient care institutions, and particularly to methods for the assembly, transport and storage of disposable medical supplies.

BACKGROUND OF THE INVENTION

In the medical care industry, constant vigilance is maintained over the cost of the care provided to patients, with particular attention being given simultaneously to assuring the well-being of the patient. One method currently being practiced by some health care institutions, particularly hospitals, is centered around the concept of clinical pathways. As used in this environment, the concept attempts to bring to bear upon the care afforded a patient all those resources of the institution which are dictated by the nature of the patient's illness and which will provide the dictated care, and result in the patient being restored to that state of health that permits proper release from the institution after a minimum length of stay. The use of the clinical pathway concept has been demonstrated to reduce the length of stay in an institution of a patient. It has further been demonstrated to reduce the overall cost of the treatment of the patient while in the institution by ensuring that no ill effect associated with the patient's stay in the institution caused the patient to require more than a standard regimen of treatment for a specific illness. For example, through proper care, the patient is prevented from developing decubitus ulcers which could require that the patient remain in the institution for an extended period of time, just for treatment of the ulcers.

In health-care institutions employing the clinical pathway concept, there is developed within the institution a protocol for the treatment of a given illness, surgical procedure, or other regimen of medical care to be provided to a patient (termed a "procedure"). This protocol lists the contribution of each institutional unit (e.g. department) toward the treatment of the patient (termed a "care event"), and the sequence in which each to care event is to occur. This protocol then becomes the "standard" for the care to be provided for any patient entering the institution and suffering from the particular illness (medical diagnosis) which is addressed by the protocol.

Prior to the present invention, the clinical pathway concept has been applied internally of health care institutions, affecting only those services which originate within the institution and which are provided by the internal resources of the institution. No correlation of the protocol to the cost of supplies in known to have been made prior to the present invention. Yet, one of the major sources of costs associated with the treatment of a patient in an institution is the cost of the supplies which are consumed by the institution. Because of this shortcoming of the clinical pathway concept, health care institutions have failed to achieve significant cost savings with respect to the supplies used in the course of any given protocol. This is especially true with regard to disposable medical supplies which typically are supplied to the institution from outside sources.

U.S. Pat. No. 5,235,795 discloses a method for the delivery, storage, transport and disposal of medical supplies to a health care institution in which the ultimate cost to the institution of the medical supplies is reduced by supplying disposable medical supplies direct from a supplier in receptacles which may thereafter be used by the institution in safely disposing of waste medical supplies. This method is dependent upon the institution identifying the supplies needed and placing an order for the same from a supplier. The usefulness of the method therefore is limited by the institution's accuracy of ordering. If the institution has inadequate facilities to determine its supply needs, and as a consequence orders too little or too much of a given supply item, this prior art system has no means for detecting this shortcoming.

It is therefore an object of the present invention to provide a method for the selection and delivery of medical supplies to a health-care institution.

BRIEF DESCRIPTION OF THE DRAWINGS

Other objects and advantages of the invention will be recognized from the description provided herein, including the claims and drawings in which:

FIGS. 6a through 6h is a printed listing of a bill of materials used in one embodiment of the present invention; and FIGS. 7a through 7i are five pages of sequencing instructions.

SUMMARY OF THE INVENTION

Figure 1:
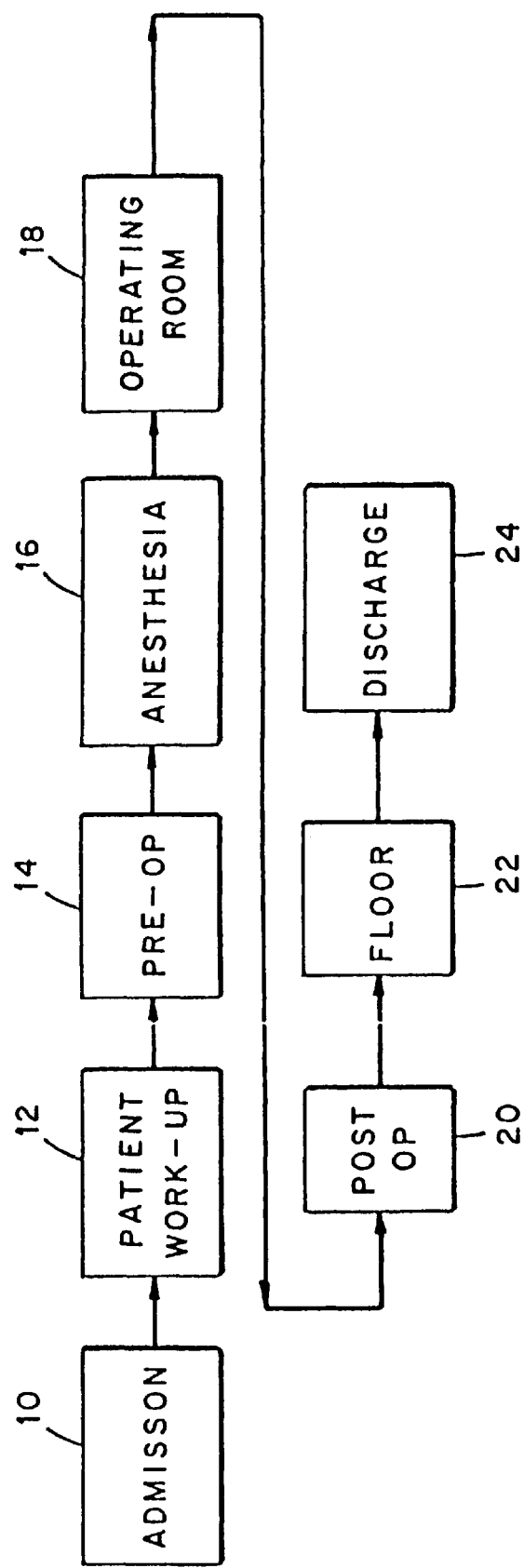
FIG. 1 is a diagrammatic representation of a generic clinical pathway as applied to a health-care institution.

In accordance with the method of the present invention, the supply needs of a health-care institution are integrated into a system for the delivery of these supplies to the institution. The method comprises a nested multi-level system in which the smallest element of unitization in the system is termed a "unit". Units are combined into supply bundles which are subassemblies to consumption levels (i.e. care events), and consumption levels are subassemblies to a particular clinical pathway. In this manner, the institution may follow an object-oriented, unitized approach to supply consumption along with the clinical pathway.

The method of the present invention includes the steps of expressing those items of -medical supplies which a health care institution requires for a given care event (consumption level) in a clinical pathway for a given medical procedure, as a bill of materials, employing identification codes (identifiers) which include at least an identification of the care event with which the supply is to be used, and identification of the item itself. Employing the identification codes, a bill of materials which is representative of those medical supplies identified for a given care event within a clinical pathway, is prepared preferably at a first location of medical supplies. At the first location, at least a first portion of the medical supplies on the bill of materials is unitized into a unit. One or more units may be prepared. The unit or units are deposited in a container having a void volume which is greater than the volume occupied by the unit. The container with the unitized medical supplies therein is releasably closed and thereafter transported to a remotely located second supplier. At the location of the second supplier, at least a second portion of the medical supplies on the bill of materials is unitized. At the location of the second supplier, the container is opened and the unit or units of medical supplies provided by the second supplier are deposited inside the container, the container is re-closed and transported with the medical supplies, commonly to a department in a care provider (e.g. operating room of a hospital). In certain instances it may be desired that the care provider also add medical supplies to the container. In this case, the container with the unitized medical supplies from the first and second supplier is releasably closed and shipped from the second supplier to the care provider. This care provider thereupon opens the container and adds to the container those medical supplies which it can most advantageously supply. The container may then be closed and either placed in inventory or transported to the end user. The present method accommodates these steps of the procedure in that the initial bill of materials lists thereon those medical supplies which are to be added to the container by the care provider prior to the container being forwarded to the end user. The advance notice provides to each tier of suppliers precisely where and what products are required and the means by which each supplier can ensure the availability of its designated medical supplies well in advance of the need therefor. Ordering of medical supplies from a manufacturer and inventorying of the supplies are both enhanced by the present method.

The unique identifiers employed in the present method serve multiple purposes. These codes include identification of the supplier of each item of medical supply, through multiple levels of supply within the supply chain as necessary, thereby providing traceability of the item to its source as is required by federal and other regulations for the handling of medical supplies, particularly sterile medical supplies. Further, each code includes identification of that care event within the clinical pathway of the institution where the supply item is to be used, thereby assuring that the particular supply item is delivered to its intended point of use, so that the institution's clinical pathway is not disrupted by reason of the item of supply not being available at the time and place with the institution when needed. First, this aspect of the method permits the institution to order disposable medical supplies by procedure, as opposed to the traditional ordering of individual items of medical supplies for warehousing at the institution and withdrawing from the stock of these supplies as needed. Second, this aspect of the method further permits the institution to stock medical supplies on the basis of historical information as to the number of given medical procedures (care events) that are to be expected within a given time frame. This capability permits the institution to stock standardized units of supplies for statistically calculable demands for the supplies and thereby reduce supply inventories.

DETAILED DESCRIPTION OF THE PREFERRED EMBODIMENTS

Referring to FIG. 1, a generic clinical pathway for a given medical procedure within a health-care institution may include a series of care events such as admission 10, patient work-up 12, pre-op 14, anesthesia 16, operating room 18, post-op 20, floor 22 and discharge 24. In accordance with the present invention, the disposable medical supplies which the institution must obtain from a source outside the institution, as well as any medical supplies that are to be provided by the institution itself, and which are associated with a given care event, are identified. Each identified item of supply is assigned a unique code which identifies at least the item itself, the source for the item and the care event with which the item is to be used within the institution. Each code also may include identifiers of the anticipated user of the supply, such as a surgeon's initials, and other identifier information. Preferably, the federally promulgated ICD-9 code (International Classification of Disease—9th Revision) for a given medical procedure is used to identify the clinical pathway with which the supply item is to be used.

The preferred code further includes an identifier for the location within the clinical pathway, i.e. care event at which the bundle of the supplies is to be consumed, e.g. in the operating room. Accordingly, the code comprises a nested multi-level system—the supply item identification, bundle identification, supplier identification, and care event identification.

A typical code, listing the levels of the code, for a supply item is given below:

| | |
|---|---|
| 90-aaaabbbcxxxxx | Clinical Pathway Level |
| aaaa | ICD-9 code (without decimal point) |
| bbb | Surgeon's initials |
| c | product configuration code (guarantees unique number) |
| xxxxx | not used (blank) |
| 91-eeeeffffggggg | Consumption Point LEVEL |
| eeee | consumption point identifier code |
| ffff | protocol identification code |
| ggggg | code used to guarantee a unique number |
| 92-hhhiiiiiiixxx | Supply Bundle Level |
| hhh | supply identifier code |
| iiiiiii | unique serialized indentifier code |
| xxx | code used to guarantee a unique number |

A typical bill of material developed from the unique number and coded supply items associated with the operating room level of the clinical pathway for a laparoscopy cholestomectomy protocol (performed by Dr. Jones) is given below:

| PART | DESCRIPTION | QTY |
|---|---|---|
| 90-0926JAJSO768 | Dr. Jones Lap Choly Procedure | 1 |
| 56-11208 | TraceCart Lid | 1 |
| 56-11360 | TraceCart Base, 30 Gallon | 1 |
| 91-OPRRM462078 | Operating Room Supply Bundle | 1 |
| 92-DER3345380768 | DeRoyal Supply Bundle for OR | 1 |
| 50-9783P | Basic Endo Pack | |
| 28-0500 | Probe, Irrig/Aspir w/Tubing | 1 |
| 56-50315 | Tape, Video VHS 120 | 1 |
| 71-1101 | Suction Canister, 1500 cc | 1 |
| 92-OMI3345380768 | O & M Supply Bundle for OR | 1 |
| OMI1553522 | Grounding Pad, Hydrogel, REM | 1 |
| OMI1832354 | Tray, Skin Prep | |
| OMI1443872 | Tray, Foley 16 Fr. 5 cc | 1 |
| OMI1883624 | Cath, IV PL Unit | 1 |

Each identifier (identification code) may include alpha, numeric or a combination of alpha and numeric characters.

The maximum number of characters in any given identifier is limited only by the data handling system(s) available to the manufacturer, the distributor, the institution, and the end-user. It will be recognized that the entity which initiates a bill of materials must have access to full information for each care event as will enable the entity to generate the bill of materials. This includes information as to which medical supplies and how many of each are required by a given health care provider for a given care event. It also requires that the initiator of the bill of materials have in its database full information as to the source and identification of each item of medical supplies which is to be provided for a given care event.

In the present method, the identifiers associated with the medical supplies intended for a given care event, within a clinical pathway, are initially expressed as a bill of materials which is thereafter used as the basis for collecting and unitizing the medical supplies. A single bill of materials for a given supply bundle is used by all providers of medical supplies that go to make up the supply bundle.

Figure 2:
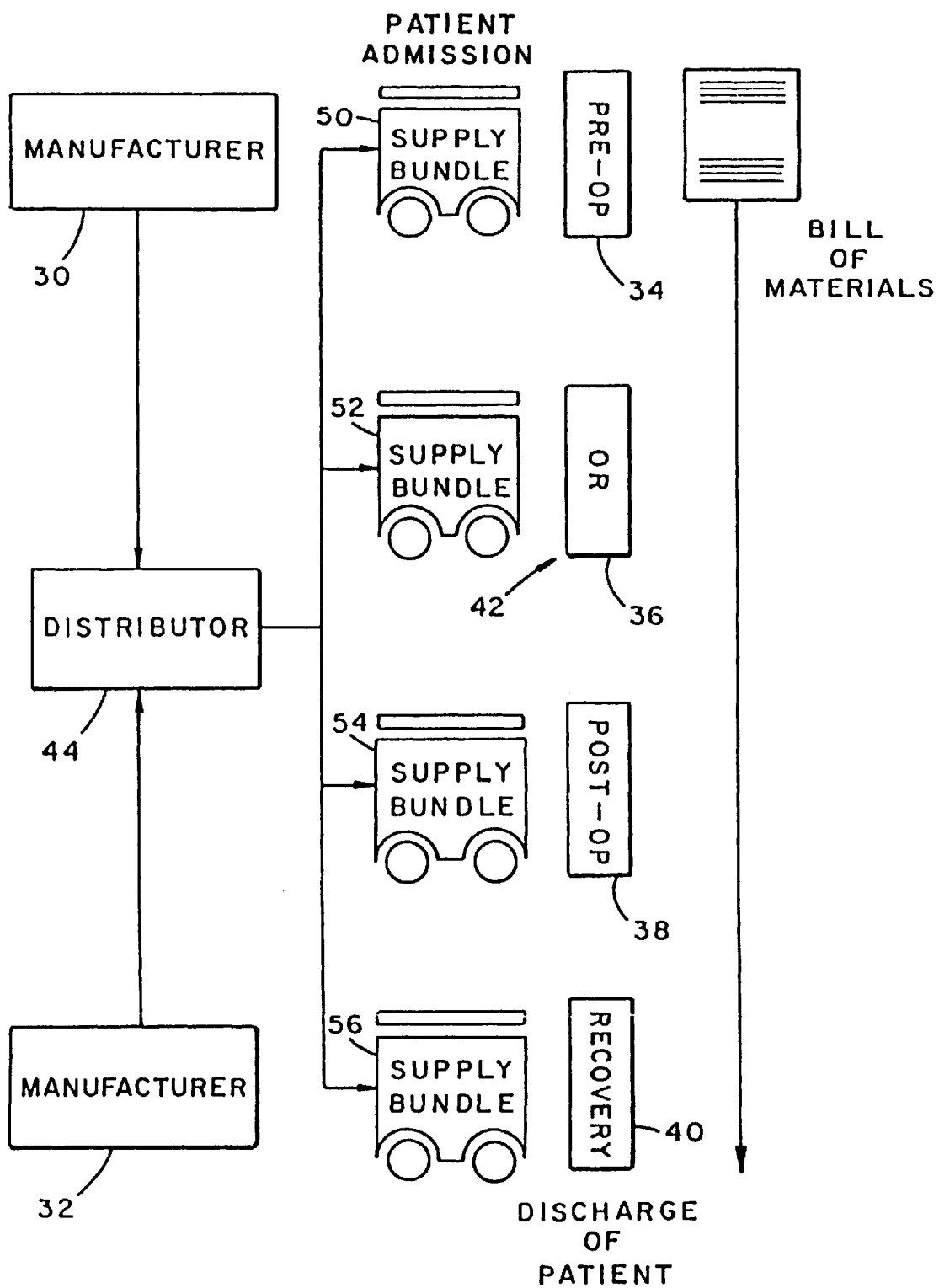
FIG. 2 is a diagrammatic representation depicting various aspects of one embodiment of the method of the present invention.
Figure 3:
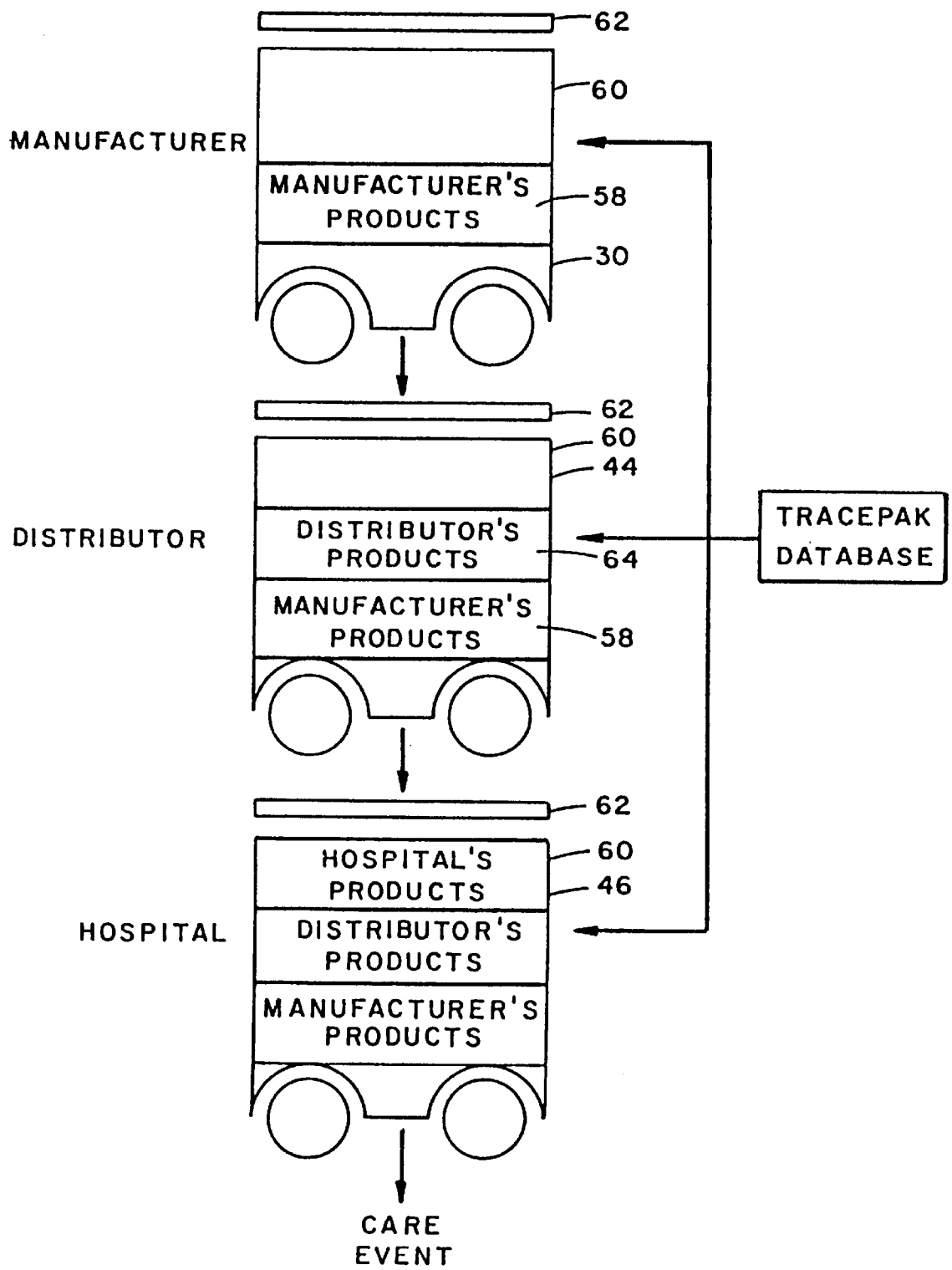
FIG. 3 is a diagrammatic representation depicting other aspects of one embodiment of the method of the present invention.

With reference to FIGS. 2 and 3, in accordance with one embodiment of the present method, a typical supply chain for products made, delivered and eventually used in a medical care facility, such as a hospital, which employs the clinical path concept in its patient care functions, includes one or more manufacturers 30 and 32 of one or more of the supply items used in one or more of the care events 34, 36, 38 and 40 of a clinical path, indicated generally by the numeral 42, and, optionally, is a distributor 44 of one or more of the supply items used in one or more of the care events of the clinical pathway. The supply chain is completed by the inclusion of the medical care facility 46 itself. In certain instances, medical supplies for a given care event may be supplied by the manufacturer and by the hospital, or by the distributor and the hospital or by all three, or even including multiple distributors or multiple manufacturers.

With further reference to FIGS. 2 and 3, in one embodiment of the present method, supply bundles 50, 52, 54 and 56 which are intended for use within respective care events 34, 36, 38 and 40, originate with one or more manufacturers 30 and 32. At a first manufacturer's 30 location, one or more supply items, manufacturer, are unitized into a unit 58. This unit of medical supply items is placed in a container 60 which is releasably closed, as by a removable lid 62. Optionally, and most commonly, this container and its contents are thereafter transferred to the location of a distributor 44 where one or more additional supply items are unitized into a further unit 64 and placed in the container 60. The container with its contents of medical supplies is referred to as a "supply bundle". The supply items provided by the distributor commonly are products provided by a second manufacturer 32 other that the first manufacturer, thereby, requiring that either the distributor or the second manufacturer cooperate in assigning to the supply items provided to a supply bundle appropriate identifiers that are consistent with the identifier protocol established between the medical care provider and the first manufacturer, for example this most commonly is accomplished by the first manufacturer initially establishing an identifier for each medical supply item to be included in a given bundle, plus other appropriate identification elements, which the distributor also uses. For example, the distributor may affix the appropriate identifier which is provided by the manufacturer, to each supply item which the distributor adds to the bundle.

The container with the two or more units of medical supplies contained therein is releasably resealed by the distributor and transported to the medical care facility, e.g. a hospital. As depicted in FIGS. 2 and 3, at the hospital, each supply bundle, comprising the container, its lid, and one or more units of medical supply items, is delivered to the location of that care event for which the supply bundle was designed, for example, to the OR (operating room) when needed. As noted above, the hospital, through its historical usage records for its medical supplies for a given care event, can readily order from a manufacturer, and the manufacturer (and distributor) can readily deliver, in a timely fashion, those medical supplies which are required for the given care event. Timing of the ordering and delivery of a given supply bundle is further enhanced through the use of the hospital's historical records relating to the frequency of occurrence of a given care event within the hospital.

In accordance with another aspect of the present method, the inventors have found that many care events, as defined in the clinical pathway concept of providing patient care, even though taking place at different levels Qf a given clinical pathway and/or even in the clinical pathway for disparate illnesses (i.e. for different ICD-9 codes) call for the use of common items of medical supplies. Therefore, based upon a given hospital's historical occurrence rate of all (or many) of its ICD-9s in combination with the hospital's usage rate for each of its care events, irrespective of the ICD-9 with which the care event may be associated, the inventors can project the total usage by the hospital over time of each item of its medical supplies. With this information in hand, a manufacturer of a variety of medical supplies can anticipate the usage of those medical supplies which it contemplates that it will provide to the supply bundle. The manufacturer, therefore, can more efficiently control its ordering and inventorying of raw materials, can better schedule its manufacturing operations, and can reduce its inventories of finished goods. Because of this capability, the medical supplies can be provided to the hospital at a cost that permits the hospital to minimize its cost of providing health care to its patients. These same benefits are available to the distributor, the hospital, or any other entity in the supply chain.

One feature of the present method provides for the generation of the bill of materials at the outset, i.e. upon receipt by the manufacturer of an order for a particular procedure. Since the bill of materials as initially generated includes identification of the supply items which are to be provided by each of the manufacturer, the distributor and/or the hospital, a copy of the bill of materials provided to each entity substantially immediately upon its completion provides useful advance notice to the entities so notified that the order has been received and is being processed. Importantly, this advance notice also identifies to each entity the products which they are expected to provide so that they can "pre-process" the order by collecting and unitizing the supply items in anticipation of receipt of a container from the entity ahead of them in the supply chain. This feature shortens the time between placement of an order and delivery of the product to the extent that the hospital can rely on "just-in-time" type delivery of the needed supplies. This results in less inventory of supplies at the hospital and reduced costs. Like inventory cost savings are experienced by the distributor.

Still further, the present method, and its shortened delivery time for specific medical supplies, permits the hospital to include patient-specific items in a given bundle. For example, patient-sized items such as endotracheal tubes and foley catheters commonly can not be specified until the patient surgery (or other specific treatment) is scheduled. Heretofore, the hospital and/or distributor had to keep on hand inventories of such patient specific supplies. Because of the control over inventory and short lead time afforded by the present method, these items can be included in a specific bundle which is labeled for a specific patient. Again, this permits the hospital to reduce its level of inventory of the medical supplies and realize monetary savings.

The unitizing of the medical supplies by a manufacturer may take any appropriate form, but preferably includes collecting the medical supply items and enclosing them in a protective cover, such as a bag (which may be sealed) or a wrap of the type known in the art as a sterile wrap. The function of the protective cover is two-fold primarily. First, the cover protects the products from possible contamination and from possible damage due to shifting or movement during transit or handling. Second, the cover unitizes, that is segregates, the collection of medical supplies so that the unit can be readily identified. This identification includes identification of the unit as a billable item for purposes of reimbursement accounting. That is, the unit, through its unique identifier, provides both the hospital and a third party payment provider, such as Medicare, Medicaid or insurance company, with sufficient information to qualify the unit of medical supplies as a valid reimbursable entity.

The container employed in the present method can be one of the type which is disclosed in U.S. Pat. No. 5,235,795, for example, which patent is incorporated herein in its entirety, by referenced. This patent further describes a type of packaging of medical supplies which is acceptable for use in the present method. Other containers, including bags or conventional boxes may be employed.

Figure 4:
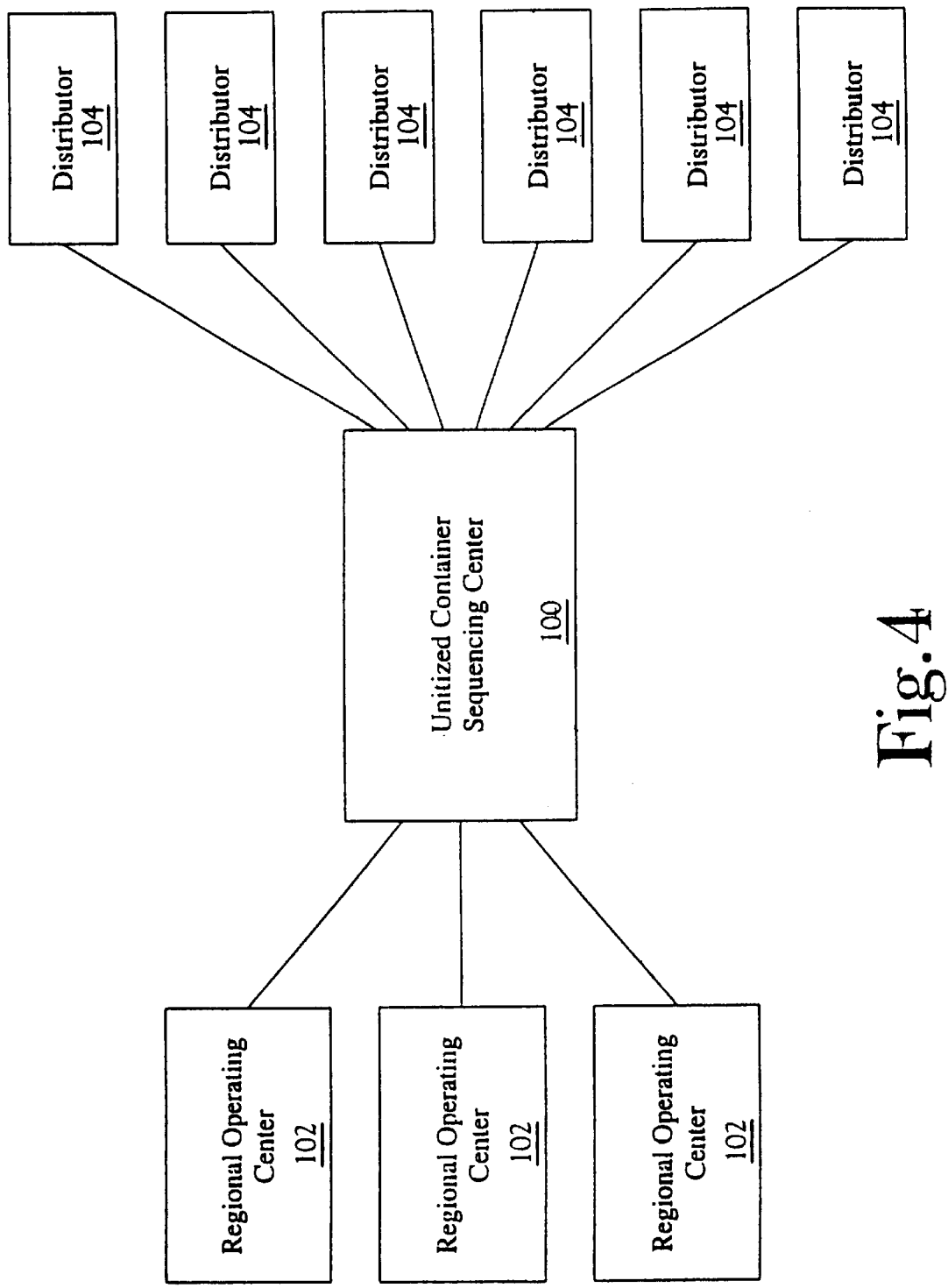
FIG. 4 is a diagrammatic representation of the supply structure of one embodiment of the present invention.
Figure 5:
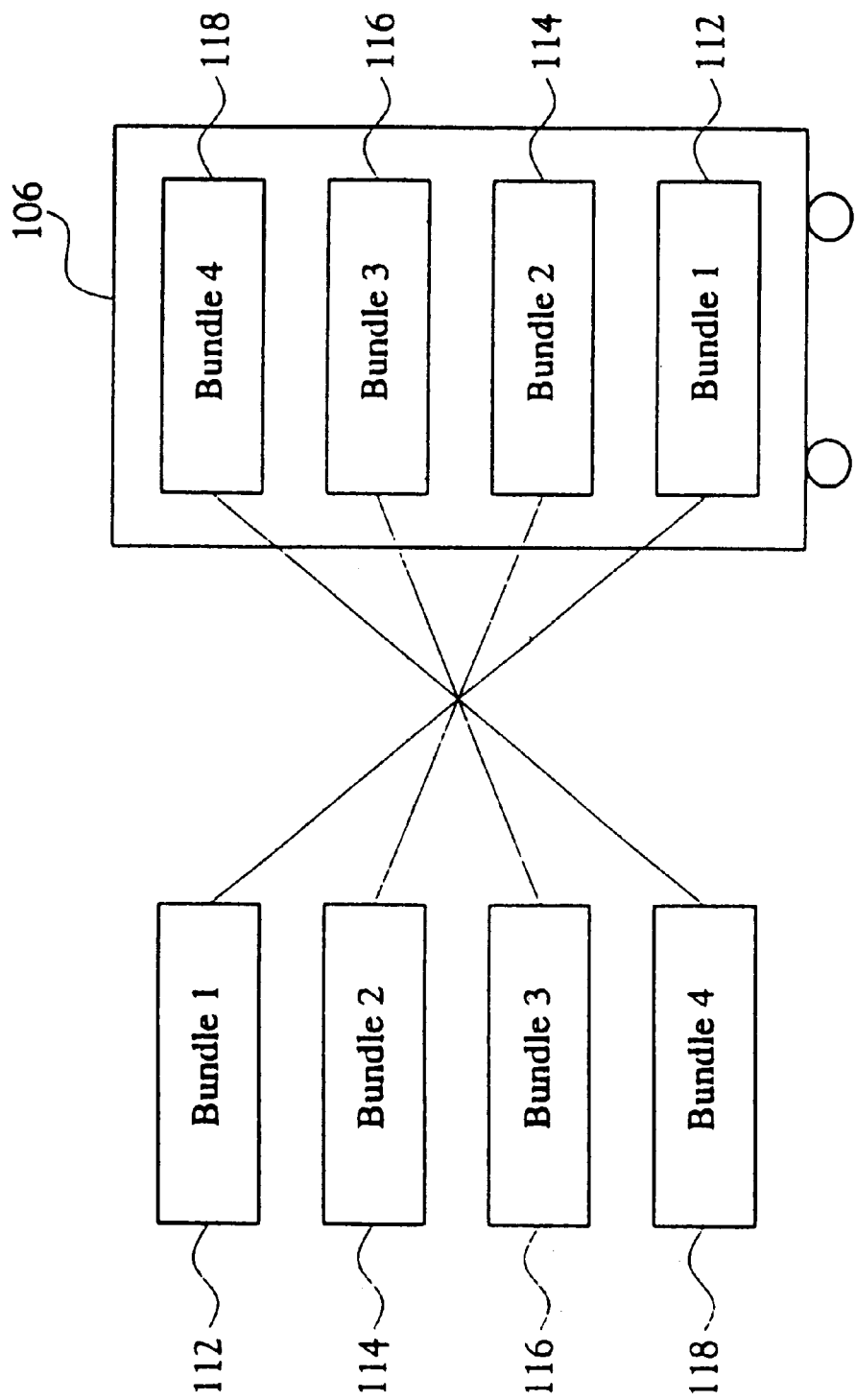
FIG. 5 is a diagrammatic representation depicting various aspects of one embodiment of the present invention.

Referring now to FIG. 4, there is shown an alternative supply arrangement to that previously described. The previously described supply method could be described as "series" or "sequential" since the container is shipped from source of supply to source of supply and is packed with additional supplies at each source. FIG. 4 shows a method for constructing the unitization of medical supplies at a central "sequencing center." This method still relies upon the nested bill of materials, previously described, to provide for the proper ordering, assembly and packing of the supplies, but does not require the physical shipment of the container to multiple locations and allows for bundling of supplies from multiple sources within the unitized container for ease of use by the end-user.

As was the case previously, when a hospital, or other user of medical supplies, determines that supplies to be used in a given medical procedure are needed, an order for unitized container of supplies is placed; usually with a local distributor 104. The nested bill of materials associated with the procedure is automatically associated with the order and has the attributes previously described. This nested bill of materials is printed at or sent to a Unitized Container Sequencing Center 100. Typically, this Sequencing Center 100 is located at a geographically central location so as to be easily reached by supply shipments and to allow for the quick shipment of unitized containers to various distributors. Once the order is received at the Sequencing Center 100, orders are provided to Regional Operating Centers 102 which are operated by the various suppliers who supply components for the procedure. The components are shipped from the Regional Operating Centers 102 to the Sequencing Center 100. The unitized container is then packed (as will be described later) and closed for shipment to a specified distributor 104. This distributor, without opening the container, will then further ship the container to the appropriate customer. Thus, while the benefits of use of the nested bill of materials is retained (i.e., the various supplies are packed according to the procedural pathway, traceability of the supplies to the vendor is maintained, and the supplies are ordered from the most cost effective provider) the efficiency in packing the container is enhanced.

Referring now to FIGS. 5–7e, the packing of the unitized container 106 at the Sequencing Center 100, will be described. First, as was described with respect to FIG. 4, the supplies listed on the nested bill of materials (108 of FIGS. 6a through 6e) are collected at the Sequencing Center 100 from the Regional Operating Centers 102. Also, associated with the nested bill of materials 108, is a set of Sequencing Instructions, FIGS. 7a through 7e. As can be seen in FIGS. 7a through 7e the sequencing instructions describe how the supplies are to be if grouped. In this manner, multiple bundles 112, 114, 116 and 118 (FIG. 5) are assembled which contain supplies to be used during a portion of a medical procedure. These bundles 112, 114, 116 and 118 may contain supplies provided from variety of different vendors, manufacturers or distributors and are grouped by functionality based upon instructions from the user. These bundles 112, 114, 116 and 118 are then placed in the desired order in the unitized container 106 for shipment to the distributor for ultimate shipment to the customer.

Referring again to FIGS. 6a through 7e, the nested bill of materials of FIGS. 6a through 6e corresponds to the set of sequencing instructions provided in FIGS. 7a through 7e. FIG. 7a is a pick list showing the parts that are needed to build the pack. FIG. 7b shows the unitization instructions which show how to group the supplies into unitized bundles (such as the bundles of FIG. 5); FIG. 7c shows a label which would be applied to one of the unitized bundles assembled in accordance with the unitization instructions. FIG. 7d shows the sequencing instructions that determine the order in which the unitized bundles will be placed in the container. FIG. 7e is a checklist which is used to insure that the bundles have been placed within the container in the proper order. With these instructions, the supplies may be grouped according to functional relationship and then placed within the container in the most convenient fashion for retrieval.

In the method described with reference to FIGS. 1 through 3, the supplies in the unitized container were bundled according to functionality, but were also bundled according to source. For example, all of the supplies from a particular source relating to a specific care event were bundled together, but there would frequently be multiple bundles for a given care event. For example the example nested bill of materials set out above has two operative care event bundles, one from DeRoyal and the other from Owens and Minor. While more efficient than old supply methods, this method still requires two bundles to be opened for the particular care event, adding to the workload of the operating room assistants. However, using the methodology described with respect to FIGS. 4 through 7, efficiency may be enhanced by grouping supplies solely by usage functionality without regard to source.

In fact, since the supplies are bundled at the Sequencing Center 100 without regard to the source of the supplies, functional groupings may be more easily achieved through the sequencing instructions and additional sub-groupings can be made, if desired. For example, a supplier might be willing to provide an anesthesia care event bundle and an operative care event bundle for supplies under the first methodology, but would not be willing to go to the additional labor and expense of creating sub-bundles under the operative care event. However, at the Sequencing Center 100, instructions can provide for sub-care events under the operative care event in order to more closely match the clinical pathway; for example, sub-bundles could be assembled for incision preparation, various phases of an operation, closing, and incision dressing.

In some cases, the methodology described with respect to FIGS. 1 through 3 will be sufficient to meet the needs of the customer; however, the methodology described with respect to FIGS. 4 through 7 may be required by some customers. However, if desired, similar sets of sequencing and unitization instructions could be provided to the various suppliers along the path of the container as described with respect to FIGS. 1 through 3. Also, the centralized processing provided by the method of FIGS. 4 through 7 allows for a reduction in the number of times the unitized container 108 must be shipped, limits the number of people who will be opening and packing the container and facilitates greater quality assurance over the process for providing unitized containers in accordance with a nested bill of materials.

Whereas specific description of various aspects of the present invention have been described herein, it is intended that the invention be limited only by the claims appended hereto. For example, the specific composition of the identifier to be used need not be precisely like that which is disclosed, but may include more, or in some instances, less identifying indicia without departing from the essence of the invention. Further, in certain instances, the supply chain may not include a distributor, but rather the first provider may be the manufacturer and the second provider to add supply items to the bundle may be the hospital, itself.

Whereon specific description of various features of the invention be limited only by the claims appended hereto.

What is claimed:

1. A method for the collection, assembly and distribution of medical supplies in an integrated institutional supply chain comprising the steps of:

expressing a list of medical supply items appropriate for use in a medical procedure as a nested bill of materials on a procedure level which includes at least one care event along a clinical pathway for a given medical procedure; wherein medical supply items for use in the at least one care event are associated on said nested bill of materials with that care event;

providing at least a Portion of the information on said bill of materials to a plurality of medical supply vendors;

each of said medical supply vendors shipping supplies from at least a Portion of said nested bill of materials to a unitized container sequencing center;

assembling a unitized container containing items of medical supplies provided in said nested bill of materials; and shipping said unitized container to the location where the care event is to be performed.

2. The method of claim 1 wherein the step of expressing a list of supplies as a nested bill of materials further comprises:

expressing a medical procedure as a clinical pathway;

identifying care events along said clinical pathway, said care events comprising discrete portions of the medical procedure to be performed; and associating at least a portion of the supplies to be used during the medical procedure with at least one care event in said clinical pathway.

3. The method of claim 1 further comprising providing unitized container sequencing instructions for use in assembling said unitized container at said unitized container sequencing center.

4. The method of claim 3 wherein said step of providing unitized container sequencing instructions further comprises including unitization instructions for the assembly of medical supplies in bundles to be placed within said unitized container.

5. The method of claim 3 wherein said step of providing unitized container sequencing instructions further comprises including packing order instructions for directing the order in which items are placed in the unitized container.

6. The method of claim 1 wherein said clinical pathway comprises a plurality of care events and in which said nested bill of materials comprises a listing of supplies to be used in all of said plurality of care events comprising the additional steps of:

identifying the items of supply associated with each care event;

bundling items of supply associated with each care event together to create discrete care event bundles; and during said step of assembly of said unitized container, packing said care event bundles in the reverse order of use such that the bundle associated with the care event to be performed last is placed near the bottom of said unitized container and the bundle associated with the care event to be performed first is placed near the top of said bundle, wherein said bundles may easily be withdrawn in the order needed during the performance of the medical procedure.

7. The method of claim 6 wherein the supplies from more than one medical supply vendor are placed within at least one of the bundles during the step of bundling items of supplies.

* * * * *